Patented June 8, 1954

2,680,691

UNITED STATES PATENT OFFICE 2,680,691

TRANSPARENT FLAME-RESISTANT CELLULOSE ACETATE BUTYRATE

Harry S. Olson and Robert C. Danison, Painesville, Ohio, assignors to Diamond Alkali Company, Cleveland, Ohio, a corporation of Delaware No Drawing. Application December 16, 1948, Serial No. 65,736

6 Claims. (Cl. 106—15)

This invention relates to transparent, flame-resistant, thermoplastic compositions and more particularly relates to transparent, flame-resistant, cellulose acetate butyrate compositions incorporating highly chlorinated paraffin wax and to methods for making the same.

The term "flame-resistant," as used hereinafter in the specification and appended claims, refers to that property, possessed by the compositions of this invention, to resist combustion to the extent at least that they do not independently support combustion and are thus self-extinguishing. This property manifests itself in that such materials, when once set afire by contact with a flame, do not continue to burn for more than three seconds after such contact has ceased.

It has heretofore been proposed to render cellulose acetate butyrate flame-resistant by the admixture therewith of highly chlorinated hydrocarbons and other substances. In general, the chlorinated hydrocarbons heretofore employed for the purpose have included highly chlorinated paraffin wax. The chlorinated paraffin waxes heretofore employed for rendering cellulose acetate butyrate flame-resistant have been those possessing the highest degree of chlorination within the limits of commercial practicability, for example, chlorinated paraffin waxes containing from 70% to 75% of chemically combined chlorine. However, clear, transparent, flame-resistant compositions cannot be obtained employing these chlorinated paraffin waxes, since these materials contain a relatively large quantity of substances insoluble in cellulose acetate butyrate, and sufficient opacity is imparted by such insoluble material to the cellulose acetate butyrate to preclude transparency. This situation has obtained whether the chlorinated paraffin is combined directly with the cellulose acetate butyrate, as, for example, by milling the two substances together upon a heated rubber mill, or by intermixing separate solutions of the two substances and then evaporating the solvent from the mixture. It is therefore apparent that the usefulness of flame-resistant cellulose acetate butyrate compositions has heretofore been limited to completely opaque pigmented materials, to which pigmented materials the present invention is not directed.

Some of the substances present in ordinary highly chlorinated paraffin, such as that containing 70% or more of chemically combined chlorine, which impart opacity to cellulose acetate butyrate, are formed in the process of chlorination of the paraffin hydrocarbon material. They behave in the manner of extremely high molecular weight chlorinated compounds and apparently are polymers of molecular fragments produced during the chlorination of the paraffin material; since such materials do not dissolve readily in ordinary organic solvents nor in cellulose acetate butyrate, they impart appreciable opacity to compositions comprising such highly chlorinated paraffin wax even though present in but very minor amounts.

One of the objects of the present invention is to provide a transparent, flame-resistant composition comprising cellulose acetate butyrate combined with chlorinated paraffin wax.

Another object is the obtaining of a clear, transparent, flame-resistant, thermoplastic composition comprising cellulose acetate butyrate by a special technique for the direct combination of its several components.

Other objects will appear from the discussion hereinafter.

In fulfilling these objects, the present invention contemplates employing a highly chlorinated paraffin wax, for example, a highly chlorinated derivative of an aliphatic hydrocarbon wax having a molecular weight within the range of $C_{18}$ to $C_{36}$ hydrocarbons, preferably an average corresponding to $C_{24}$ hydrocarbons, the degree of chlorination of which is carefully controlled to fall within a specified range, whereby the existence of the cellulose acetate butyrate insoluble fraction heretofore referred to its substantially eliminated and the property of compatibility with cellulose acetate butyrate, as well as the resinous, thermoplastic properties of the chlorinated paraffin per se, and the flame-resistant character of the chlorinated paraffin are preserved. Since chlorinated paraffin wax thus obtained is soluble in the cellulose acetate butyrate, the transparency thereof is maintained. At the same time, the combination is found to have the same flame-resistance as prior art compositions, whereby the composition of the present invention are more desirable in the art of molding transparent, flame-resistant shapes from cellulose acetate butyrate than those incorporating the opacifying chlorinated paraffin waxes.

The present invention is directed to organic, resinous, transparent, flame-resistant, thermoplastic compositions consisting essentially of a major proportion of cellulose acetate butyrate, a minor proportion of chlorinated paraffin wax derived from the class of hydrocarbon waxes noted hereinabove, and containing from 64% to 68% of chemically combined chlorine, and a soluble organic stabilizer for said chlorinated paraffin wax. Moreover, the present invention is directed to a method for combining the cellulose acetate butyrate and chlorinated paraffin wax, which includes the steps of wetting said ingredients with a mutual solvent in an amount less than the combined weights of said ingredients, thoroughly interspersing said ingredients and solvent to form a viscous doughy mass, and thereafter expelling said solvent from said mass.

The cellulose acetate butyrate employed in the compositions of the present invention is a hard, tough, resinous, thermoplastic, transparent, colorless material especially suitable for the molding of ornamental shapes. The degree of chlorination of the chlorinated paraffin wax incorporated in the compositions of the present invention is carefully controlled during the manufacture thereof, so that the amount of chemically combined chlorine contained therein falls substantially within the range of 64% to 68%. It has been found, as noted above, that where the amount of chemically combined chlorine in the chlorinated paraffin wax material is in excess of about 68%, there is present in such chlorinated material large amounts of cellulose acetate butyrate insoluble bodies, which impart an opacity to the molded shapes comprising the same. Moreover, where flame-resistance sought to be imparted to the cellulose acetate butyrate is obtained solely by the addition thereto of chlorinated paraffin wax containing substantially less than 64% of chemically combined chlorine, the molded compositions are of less rigid character than is desirable for most structural purposes, in that a lessening of the tensile strength of the composition results, as well as a substantial lowering of the softening point of the composition. As the amount of chemically combined chlorine contained in the chlorinated paraffin wax decreases from the above disclosed range, such chlorinated paraffin wax material partakes increasingly of the character of a liquid; also, as the amount of chemically combined chlorine is decreased, more of the chlorinated material will be required to impart the same desired degree of flame-resistance to the cellulose acetate butyrate. It is therefore apparent that where chlorinated paraffin wax material containing less chemically combined chlorine than the above-indicated range is employed, the resulting molding composition will necessarily possess an undesirably decreased degree of structural strength for most molded thermoplastic articles.

When molding the compositions of the present invention, heat and pressure are applied thereto in order to obtain the desired shapes. For this reason, it is generally necessary to incorporate a stabilizer for the chlorinated paraffin wax material in the composition. It is, of course, understood that stabilizers employed in the compositions of the present invention are stabilizers which are effective in preventing the decomposition of the chlorinated paraffin wax materials at the temperatures at which the molding of the compositions takes place, which temperatures are necessarily less than the pyrolyzing temperatures of the cellulose acetate butyrate. It is also understood that such stabilizers must not be effective in preventing the decomposition of the chlorinated paraffin wax material at flame temperatures, inasmuch as it is believed that the decomposition of the chlorinated paraffin wax materials at flame temperatures accounts in part for the flame-resistant character of the otherwise inflammable organic composition. Moreover, the stabilizers to be employed in the compositions of the present invention, in order to be satisfactory, should be liquids or solids which are soluble in the mixture of cellulose acetate butyrate and chlorinated paraffin wax so as not to impart any degree of opacity to the composition. A further requisite is that in addition to being soluble in the mixture of cellulose acetate butyrate and chlorinated paraffin wax, the products of reaction, if any, of such stabilizers with the products of decomposition of the chlorinated paraffin wax should not be insoluble in the cellulose acetate butyrate-chlorinated paraffin wax combination lest by their stabilizing action, opacity be introduced.

A wide variety of stabilizers may be employed in the compositions of the present invention, it having been found, however, that as a general class, the epoxy compounds or derivatives thereof are especially suitable. Examples of this general class of compounds found useful in this connection are propylene oxide, butylene oxide, phenyl ethylene oxide, diphenyl ethylene oxide, epichlorohydrin, glycidol and its ethers and esters, and the like. The alkyl aryl or mixed ether or ester derivatives of glycidol have been found especially useful in this connection, particularly desirable examples being the phenyl ether of glycidol, i. e. phenoxy propylene oxide, or the oleic acid ester of glycidol. This class of materials, and especially the last mentioned preferred members thereof, are particularly suitable stabilizers in that not only are they themselves soluble in the combination of chlorinated paraffin wax and cellulose acetate butyrate, but in addition, their products of reaction with the products of decomposition of the chlorinated paraffin wax are also soluble in the combination, whereby the opportunity for opacity to develop in the compositions of the present invention during storage and in use is substantially precluded.

While the compositions of the present invention have important uses in the arts when combined as described above, for many of the uses to which the compositions of the present invention are put, it will be desirable to employ, in addition to the stabilizer materials mentioned above, a plasticizer for the combination of the cellulose acetate butyrate and chlorinated paraffin wax, which plasticizer should also be soluble in the mixture of cellulose acetate butyrate and chlorinated paraffin wax and in addition, should not be subject to the formation of by-products which are insoluble in such mixture and which would thereby impart opacity to the composition. Various plasticizers which may be added to these compositions, either before compounding with the cellulose acetate butyrate or during the compounding of the flame-resistant composition, include the phosphoric acid esters, such as tricresyl phosphate, triphenyl phosphate, ethyl hexyl phosphate, and the like. These materials are particularly suitable in the compositions of the present invention for the reason that in the amounts in which they are used to plasticize the combination of cellulose acetate butyrate and chlorinated paraffin wax, they do not impart inflammability to the compositions. In addition, the phosphate esters are liquids, soluble in the cellulose acetate butyrate and chlorinated paraffin. Another class of materials which also possesses these characteristics is the chlorinated paraffin waxes which contain from 35% to about 55% of chemically combined chlorine. Since inorganic flameproof materials are not employed in the compositions of the present invention due to their opacifying effect, it is especially desirable to employ plasticizers, such as those mentioned, which are substantially flame-resistant in themselves, or possess only a very limited inflammability.

In general, the method noted hereinabove for combining the ingredients of the present invention is susceptible of several variations without deleteriously affecting the molding compositions to be obtained therefrom or departing from the scope of the present invention. For example, either the cellulose acetate butyrate or the chlorinated paraffin wax may be dissolved in a solvent which is also a solvent for the other material and subsequently such other material, preferably in comminuted form, may be mixed with the solution of the first ingredient. The amount of solvent to be employed is preferably less than the combined dry weights of cellulose acetate butyrate and chlorinated paraffin wax, specifically from about ⅓ the combined dry weights of these materials up to equal that amount. The solvents which have been found best suited to the method and compositions of the present invention include the polar types, preferably the ketones, such as acetone, methyl ethyl ketone, pentanone, and the like. The ketones need not be highly purified substances, it having been found that commercial solvent grades of these compounds are adequate for the requirements of the present invention.

The mixing of solution and dry comminuted material may be initiated in a mill, such as a "Baker-Perkins" or a "Banbury" mill, and completed upon the cooled rolls of a rubber mill. When the mixture has been thoroughly masticated by the mechanisms above described and the ingredients thereof thoroughly interspersed, there is obtained a viscous doughy mass from which the solvent may readily be expelled as by heating, whereupon the solvent-free composition is subjected to comminution in order to render it suitable for compression-molding or injection-molding operations.

Another variation of the general method comprises combining the cellulose acetate butyrate and chlorinated paraffin wax in dry comminuted form and then wetting the mixture with a mutual solvent for these materials, preferably in an amount less than the combined weights of the dry ingredients. Thereafter, interspersion of the cellulose acetate butyrate, chlorinated paraffin wax and solvent is effected as described for the first noted variation of the general method above.

A further variation of the general method comprises wetting each of the principal ingredients separately with a mutual solvent. Again the amount of such solvent is preferably less than the combined dry weights of the principal ingredients, and interspersion thereof with the mutual solvent effected as described for the first noted variation of the general method above.

While the plasticizers and stabilizers noted hereinabove may be combined with the principal ingredients of the compositions of the present invention at any stage in the above procedures, it is preferable that they be dissolved in the solvent prior to mixing with either of the dry ingredients. More particularly, it is preferable in most instances to dissolve the stabilizer material in the requisite amount of solvent and dissolve the chlorinated paraffin wax in the resulting solution. By proceeding in this manner up to this point, intimate contact of the stabilizer and the material sought to be stabilized is assured. The plasticizer may either be incorporated in the solution of chlorinated paraffin wax or it may be dissolved in the amount of solvent used to wet the comminuted cellulose acetate butyrate, where this variation of the general method is employed. Where the principal ingredients are dry-mixed together and subsequently wetted and mixed with solvent, both the stabilizer and plasticizer may be dissolved in the requisite amount of solvent and the resulting solution combined with the dry-mixed ingredients.

In order that those skilled in the art may better understand the method of the present invention, the special properties of the compositions of the invention, and the manner by which the same may be obtained, the following specific examples are offered:

*Example I*

The following ingredients are combined with an equal weight of acetone:

66.6 parts of cellulose acetate butyrate
28.0 parts of chlorinated paraffin wax containing 68% of chemically combined chlorine
4 parts of tricresyl phosphate
1.4 parts of phenoxy propylene oxide After all of the ingredients are dissolved by mechanical mixing, a very viscous, nearly semi-liquid, mass is obtained. This viscous mass is spread evenly over the bottom of a shallow container and the acetone expelled by heating at about 225° F. After substantially all of the solvent has been removed from the mass, the residual material is cooled and comminuted to give a molding powder. A sheet 6" x 6" x 0.075" is formed from a portion of the molding powder by compression-molding at 370° F. and a pressure of 1000 p. s. i. for two minutes; from this sheet a strip is cut and tested for flame-resistance as follows: The test strip is suspended vertically in a draft-free cabinet and ignited by means of a gas flame; after the test strip is set afire, the flame is removed from contact therewith. A portion of flowing fluid material drops from the test strip and that portion of the test strip remaining ceases to flame within one to two seconds.

*Example II*

The ingredients employed are:

628 parts of cellulose acetate butyrate
560 parts of a solution of equal parts by weight of acetone and chlorinated paraffin wax containing 68% of chemically combined chlorine
80 parts of tricresyl phosphate
12 parts of phenoxy propylene oxide The tricresyl phosphate and phenoxy propylene oxide are combined with the solution of chlorinated paraffin and this solution combined with the cellulose acetate butyrate in comminuted form by mixing in a "Baker-Perkins" type mill. After about 10 minutes mixing, the composition is transformed into a non-tacky, dough-like mass, which is then transferred to a rubber mill having water-cooled rolls and the mastication continued. When the composition has reached the stage where it forms a clear, transparent sheet on the rolls, it is removed therefrom and heated to 250° F. for one-half hour and then at 200° F. for 2 hours to expell the solvent. Thereafter, the solvent-free composition is treated in the same manner as described in Example I for the preparation of a molded piece. A strip of this material tested for flame-resistance in the manner described in Example I gave substantially the same results.

The sheets of transparent, thermoplastic, flame-resistant compositions as obtained in the examples are quite clear, possessing only a very slight yellow tint, and may suitably be comminuted to any desired particle size to give a molding composition for either compression-molding or injection-molding operations.

It has been found by experimentation that the formulae given above in the examples may be varied over certain limits without destroying the flame-resistant property of the composition or its transparency. For example, amounts of cellulose acetate butyrate within approximately 50–75% of the total composition and amounts of chlorinated paraffin wax containing from 64% to 68% of chemically combined chlorine, within the range of approximately 22% to approximately 35% of the total composition, have been employed. A stabilizer for the chlorinated paraffin wax, particularly those noted hereinabove, in an amount up to about 5% by weight of the chlorinated paraffin wax, has been used, and plasticizer content, if plasticizers are used, may be up to 9% of the weight of the total composition.

While there have been described various embodiments of the invention, the products described are not intended to be understood as limiting the scope of the invention as it is realized that changes therewithin are possible and it is further intended that each element recited in any of the following claims is to be understood as referring to all equivalent elements for accomplishing substantially the same results in substantially the same or equivalent manner, it being intended to cover the invention broadly in whatever form its principle may be utilized.

What is claimed is:

1. An organic, resinous, transparent, flame-resistant, thermoplastic composition consisting essentially of 50–75% of cellulose acetate butyrate combined with 22–35% of chlorinated paraffin wax containing from 64% to 68% of chemically combined chlorine, and an organic stabilizer for said chlorinated paraffin wax to make in all substantially 100%, said stabilizer being an epoxy compound.

2. An organic, resinous, transparent, flame-resistant, thermoplastic composition consisting essentially of 50–75% of cellulose acetate butyrate combined with 22–35% of chlorinated paraffin wax containing from 64% to 68% of chemically combined chlorine, and a soluble stabilizer for said chlorinated paraffin wax selected from the group consisting of glycidol and its esters and ethers, said cellulose acetate butyrate, chlorinated paraffin wax, and stabilizer making in all substantially 100% of said composition.

3. An organic, resinous, transparent, flame-resistant, thermoplastic composition consisting essentially of 50–75% of cellulose acetate butyrate combined with 22–35% of chlorinated paraffin wax containing from 64% to 68% of chemically combined chlorine, an organic epoxy group containing stabilizer for said chlorinated paraffin wax, and up to 9% of a liquid plasticizer material for said cellulose acetate butyrate and said chlorinated paraffin wax, said plasticizer being selected from the group consisting of mono-nuclear aryl phosphate esters and chlorinated paraffin wax containing from 35–55% of chemically combined chlorine, said cellulose acetate butyrate, chlorinated paraffin wax, stabilizer and plasticizer making in all substantially 100% of said composition.

4. An organic, resinous, transparent, flame-resistant, thermoplastic composition consisting essentially of 50–75% of cellulose acetate butyrate combined with 22–35% of chlorinated paraffin wax containing from 64% to 68% of chemically combined chlorine, a stabilizer for said chlorinated paraffin wax selected from the group consisting of glycidol and its esters and ethers, and up to 9% of a liquid plasticizer material for said cellulose acetate butyrate and said chlorinated paraffin wax, said plasticizer being selected from the group consisting of mono-nuclear aryl phosphate esters and chlorinated paraffin wax containing from 35–55% of chemically combined chlorine, said cellulose acetate butyrate, chlorinated paraffin wax, stabilizer and plasticizer making in all substantially 100% of said composition.

5. An organic, resinous, transparent, flame-resistant, thermoplastic composition consisting essentially of 67 parts of cellulose acetate butyrate, 28 parts of chlorinated paraffin wax containing 64% to 68% of chemically combined chlorine, one part of phenoxy propylene oxide, and 4 parts of tricresyl phosphate.

6. An organic, resinous, transparent, flame-resistant, thermoplastic composition consisting essentially of 63 parts of cellulose acetate butyrate, 28 parts by weight of chlorinated paraffin wax containing from 64% to 68% of chemically combined chlorine, 8 parts of tricresyl phosphate, and one part of phenoxy propylene oxide.

References Cited in the file of this patent

UNITED STATES PATENTS

| Number | Name | Date |
|---|---|---|
| 2,073,004 | Engelhardt | Mar. 9, 1937 |
| 2,118,787 | Clayton et al. | May 24, 1938 |
| 2,299,612 | Clayton et al. | Oct. 20, 1942 |
| 2,397,320 | Koch | Mar. 26, 1946 |
| 2,536,978 | Fordemwalt | Jan. 2, 1951 |
| 2,590,211 | Rugar | Mar. 25, 1952 |